Aug. 3, 1954     P. M. G. TOULON     2,685,644
GENERATOR OF COMPLEX WAVEFORMS
Filed March 22, 1949     3 Sheets-Sheet 1

INVENTOR
Pierre Marie Gabriel Toulon
BY
Schaines & Liberman
ATTORNEYS

UNITED STATES PATENT OFFICE 2,685,644

GENERATOR OF COMPLEX WAVEFORMS

Pierre Marie Gabriel Toulon, Neuilly-sur-Seine, France, assignor, by direct and mesne assignments, of seventy-five per cent to Products and Licensing Corporation, New York, N. Y., a corporation of Delaware, and twenty-five per cent to Nelson Moore and William D. Hall, as joint tenants Application March 22, 1949, Serial No. 82,718

13 Claims. (Cl. 250—27)

The present invention relates to a new method and apparatus permitting the generation of periodical electrical potential waveforms of complex form (that is, non-sinusoidal) on a plurality of terminals and to permit the furnishing at these terminals of a relatively high current flow, without alteration of the form and amplitude of the potentials being produced.

This new generator permits the successive appearance, on each of the said plurality of terminals, of very pronounced peaks of potential which are necessary to assure the static switching to several independent lines, of impulses arriving successively at a single input. Each terminal of the generator feeds an independent line, through the medium of a rectifier, which may take the form of any device having a non-symmetrical conductibility (e. g., a valve, a copper oxide, or "germanium" crystal rectifier, etc.).

All of these rectifiers are normally blocked, due to their polarization in the appropriate direction. The peak potentials, furnished by the generator, appear successively on the different terminals, connected with each rectifier, and have the effect of successively and instantaneously compensatnig the various rectifier polarizations and of thereby opening each output line alternately.

The "peak" potentials of the generator are obtained by the vectorial addition of several sinusoidal potentials, herein called "component waves", having different frequencies, said component waves being in harmonic progression with one another ($K_1F$, $K_2F$, etc. being the frequency of the wave at the "peaks"). These component waves are placed in series, and the phase of the vector representing each component wave is chosen in such a way that the maxima of the added waveforms appear alternately on each terminal of the generator. In accordance with the invention these component waves are obtained by using a polyphased distribution of current for each frequency utilized, on which are picked up the waves which are placed in series: the essential characteristic of the invention resides in the fact that each one of the component waves is constituted by the putting in series of two or more "elementary" waveforms; this latter is realized notably by connecting, in series, the secondary coil windings, having a number of turns, disposed on the transformers, which are fed respectively by the different phases of each distribution at each frequency.

To obtain the component tension with its appropriate phase, the procedure in accordance with the invention consists in the analysis of each "component" wave into elementary waves, having the same phase as that of the feeding distribution at the desired frequency. Preferably, two-phased distributions are used for the feeding: the vectors which represent the elementary waveforms correspond then to the orthogonal projections (sine and cosine) of the vector which represents the component waveform.

Each of the phases of the distribution feeds a transformer on which are disposed as many secondary coils as there are independent terminals on the generator. The number of turns of each one of these secondaries is chosen in correspondence with the amplitude of the elementary wave to be realized (that is to say corresponding notably to the orthogonal projections of the vector of the component wave desired).

The phase of each one of the component waves is thereby fixed in such a way that the maxima (or peaks) of the complex waveform are produced at the desired instant, the maxima of the different terminals being shifted in relationship to one another in such a way as to correspond to the arrival of the successive signals which are to be switched to the different output lines.

This new generator of complex waves permits the discharge of appreciable currents, without the occurrence of distortion in the amplitude of the peak or its phase. This generator thereby permits the carrying out of the switching at a very high power level. Under these conditions, it becomes possible to directly distribute the signals to each independent circuit being utilized, without there being any need to amplify them, as was generally necessary to the present time in systems for the distribution of impulses.

Applied to multiplex telephony, the new procedure permits the direct feeding of each subscriber's line. In the case of television, applied for example to the case of multielementary screens, the new procedure permits the direct feeding, without amplification, of the electro-optic elements which serve to reproduce the image, or again, if a distribution in cascade comprising several distributors disposed one after the other is used, it permits the passage, at each stage of the distribution, of enough power to feed the following stage without there being need to amplify at each operation.

The new generator of shifting maxima of potential is equally applicable to the transmission of signals, arriving by different lines, to a single output track in such a way as to effectively and alternately connect these input lines to the output track.

This new generator is equally applicable to any other system in which one calls upon positive or negative peaks of a waveform applied successively and periodically to similar parts of the system, with a view toward modifying their potentials.

Several figures accompanying the text will aid in the comprehension of the objects and modes of carrying out the invention in some specific cases.

Figure 1 gives the general diagram of a distributing system including the new waveform generator at "peak," in conformity with the invention.

Each of these figures are given merely as a guide and have no restrictive or limitative character as to the scope of the invention.

Figure 1:
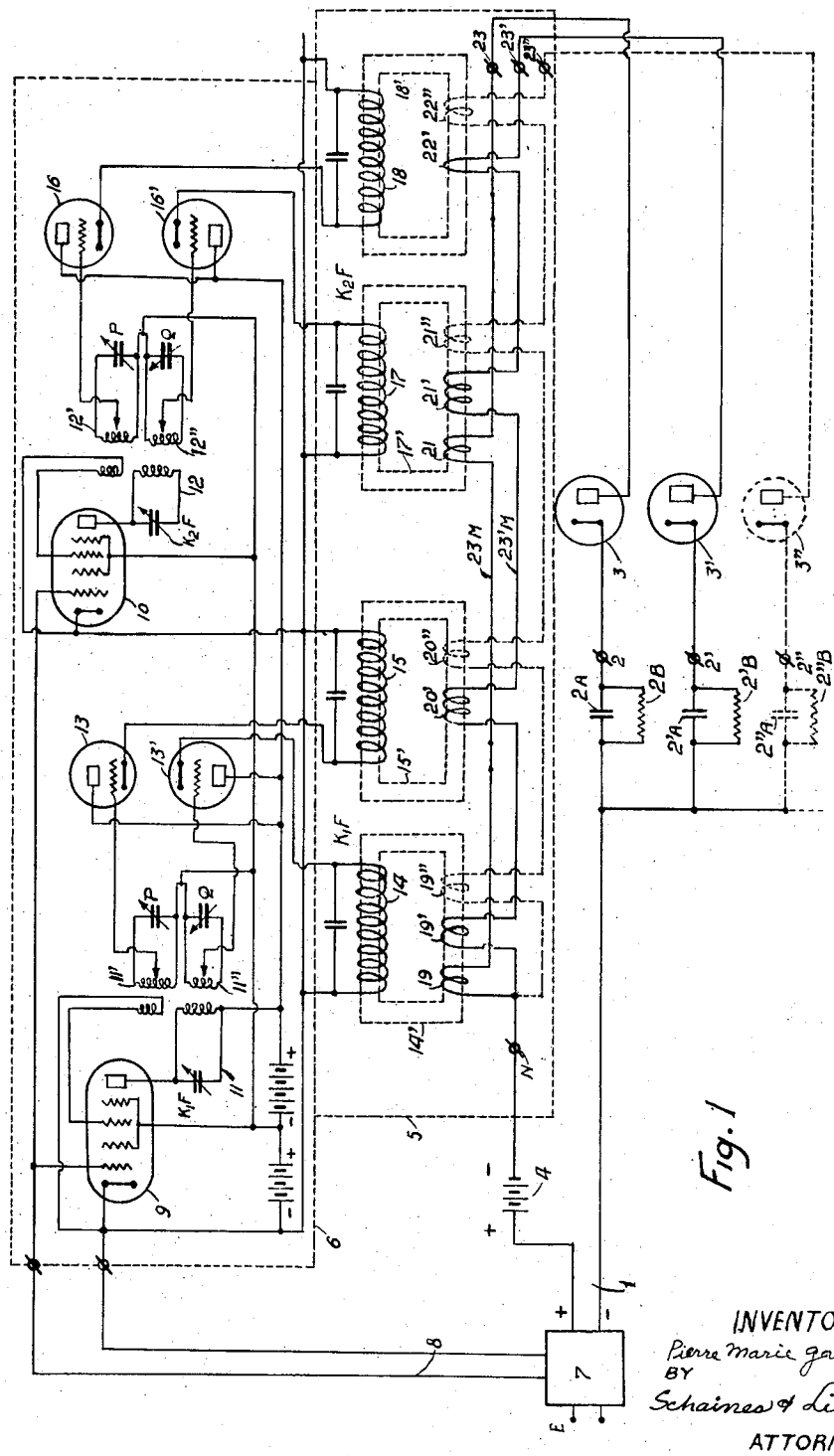

Referring to Figure 1 a general diagram has been shown of a static distributing system utilizing a generator producing a peaked waveform, in conformity with the invention.

The numeral 1 refers to the common track by which the impulses that are intended to be distributed among a certain number of independent lines 2, 2', 2'', arrive successively at a high frequency. Each one of these output tracks is represented by a capacity 2A discharged by a resistance 2B.

Each output line is fed in parallel by the common track 1 and each of them respectively includes a series rectifier 3, 3', 3'', and a battery or source of polarizing potential 4 oriented in such a direction that the rectifiers are normally blocked. Either a valve, or rectifiers of the copper oxide type, or a patch of germanium may be used. The terminals 23, 23', 23'' of the generator feed the rectifiers in such a way that each peak of the generator output compensates momentarily the effect of the battery 4. The "peaks" of potential appear alternately on these terminals, thus statically distributing the input signals to the various output lines.

To feed the generator, a group of oscillators (unit 6) is used, which is synchronized by special signals (synchronization pulses) transmitted at the same time as the useful signals.

The letter E represents the input circuit while unit 7 represents a signal separator selecting the useful signals which are directed to track 1 and the synchronization pulses which are directed to track 8, these latter pulses serving to synchronize the generator. The pulses in track 8 are fed to the internal grid of each of two tubes 9 and 10, each of which has two control grids. The first of these tubes 9 is required to produce an output frequency $K_1F$, and the second of these tubes 10, the frequency $K_2F$. For this purpose, the plate circuit of tube 9 includes an oscillating circuit 11 resonant at the frequency $K_1F$ and a feedback loop tending to maintain the oscillations is coupled to the second control grid of the stage. In the same way, the plate circuit of tube 10 includes an oscillating circuit 12 resonant at the $K_2F$ frequency and a feedback loop is also coupled to the second control grid of this tube.

Two further oscillating circuits 11' and 11'' are coupled to the oscillating circuit 11; by regulating the value of the capacitance, these two circuits are respectively peaked above and below the resonance point, there thus being produced in the output two waves respectively in quadrature and at the frequency $K_1F$; and by proper choice of the number of coil turns in the oscillating circuits, one succeeds in applying to the grids of the amplifying tubes 13 and 13' output potentials of appropriate and equal amplitude. The amplifying tubes and transformer windings are connected in counter-reaction, (cathodyne set-up). That is, one end of each of the primary windings 14 and 15, of the two transformers 14' and 15' associated with the frequency $K_1F$, is respectively connected in series to the cathodes of these two tubes 13' and 13.

In an analogous fashion, two oscillating circuits 12' and 12'' are respectively tuned above and below the resonant point of circuit 12 and are coupled to the oscillating circuit 12 (resonant at the frequency $K_2F$), thereby producing two output waveforms in quadrature, and at the frequency $K_2F$. Again by proper choice of the coil turns of the oscillating circuits, one succeeds in applying to the grids of the amplifying tubes 16 and 16', potentials of appropriate and equal amplitude. Tubes 16 and 16' are connected to their associated transformers 17' and 18' in a manner similar to that already described; that is, the primary coils 17 and 18 of the two transformers associated with the frequency $K_2F$ are coupled respectively in series with the cathodes of the two tubes 16' and 16. Due to the "cathodyne" connections, if the potentials applied to the control grids of the two tubes are in quadrature and have a certain value, the circuits of utilization comprising the transformer primary windings also have substantially the same phase and the same amplitude, no matter what the charge imposed upon the current of utilization is; thus the value of the waveform is exceedingly precise and stable.

In accordance with the invention, each terminal 23, 23', 23'', is connected in series with secondary coil windings of each of the transformers. These secondary coil windings, through proper choice of direction of winding and number of turns permit the creation of the desired potential "peaks" shifted in relation to one another, as will be explained on Figure 2.

The secondary coils disposed on the transformer 14', whose primary winding is 14, are designated by 19, 19', 19'', and the secondary coils disposed on the transformer 15' whose primary winding is 15 are designated by 20', 20''.

The secondary coils disposed on the transformer 17', whose primary winding is 17, are designated by 21, 21', 21'', and the secondary coils disposed on the transformer 18' whose primary winding is 18 are designated by 22', 22''.

A first line feeding the terminal 23 of the generator comprises the secondary coil windings 19 and 21 disposed in series. A second line, feeding the terminal 23' of the generator, comprises the secondary coil windings 19', 20', 21', 22', connected in series. A third line feeding the terminal 23'' of the generator comprises the secondary coil windings 19'', 20'', 21'', 22'', disposed in series, and so on.

Due to the choice of the coil windings, the

"peaks" of tension appear successively on the different terminals 23, 23', 23". The common terminal of the generator has been designated by N and the conductors coupling between the transformer coils respectively associated with the frequencies $K_1F$ and $K_2F$ are designated by 23M, 23'M.

The functioning of the system of static switching may now be readily seen. At the moment the first signal arrives upon input track 1, a maximum of the complex waveform, in the form of a peak which overcomes the polarization of battery 4, appears at the terminal 23; therefore this first incoming signal is switched onto output line 2.

A little later, when a second signal arrives by track 1, the peak potential appears at terminal 23' thereby overcoming the polarization of battery 4 and this second signal is thereby switched onto output track 2'.

Still later, when a third signal arrives by track 1, it is the terminal 23" which is now at its maximum potential, and the third signal finds itself switched on to track 2", and so on.

Figure 2:
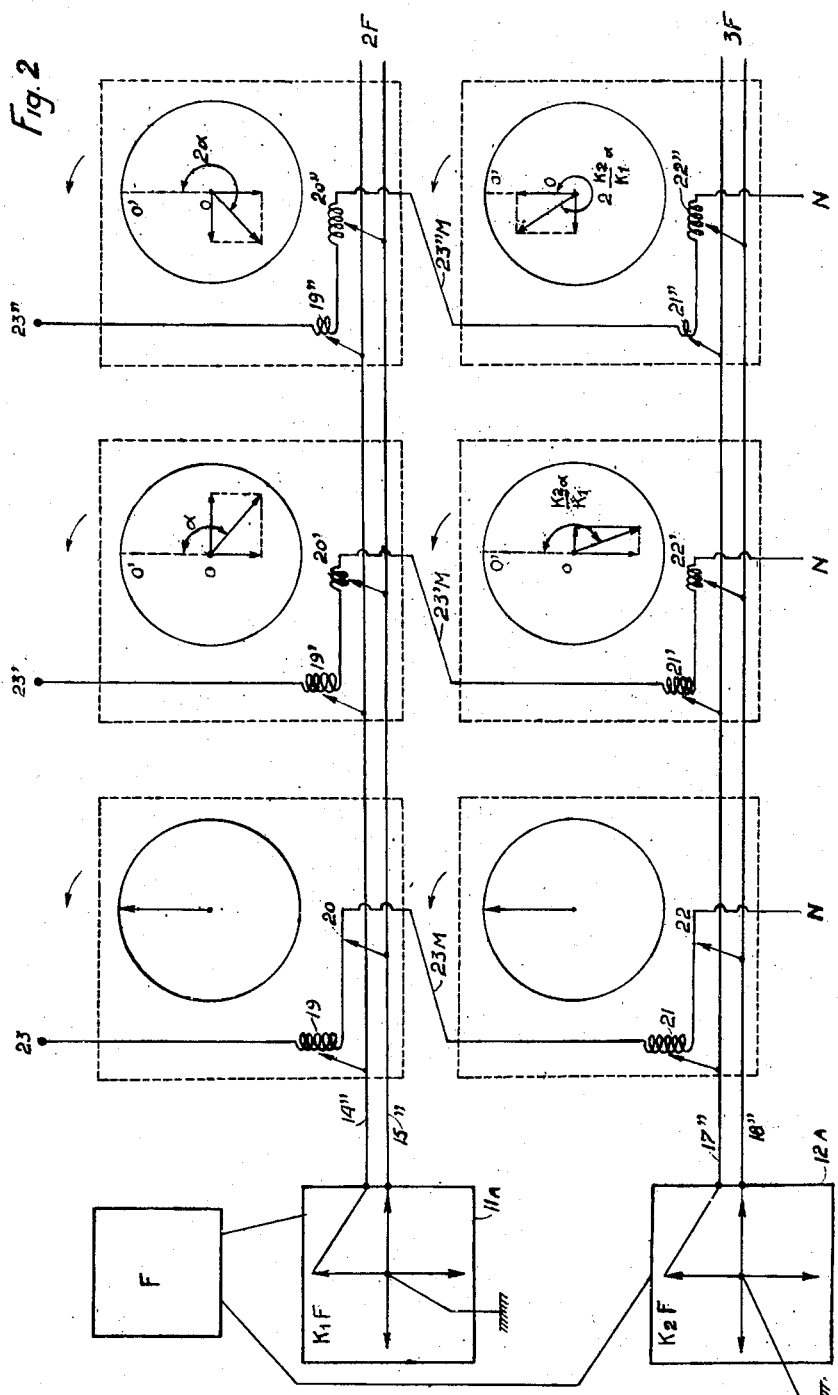
Figure 2 is a diagram illustrating the relationship between the number of turns to be adopted for each secondary and the vectorial diagram representing the component wave desired.

Figure 2 is a simplified schematic representation of the generator illustrating the required phase relationships which must be established among the various waveforms feeding, at each frequency, the successive terminals 23, 23' 23", of the generator, so that the "peaks" or maxima of the complex waveforms find themselves regularly shifted in relationship to one another.

This figure illustrates the elements of the synthesis of each waveform and shows how each complex waveform is effected by addition of component waves at the different frequencies $K_1F$, $K_2F$ it further illustrates how each component waveform is realized in turn by the addition of elementary waves in quadrature. Figure 2 also shows how the number of turns, and their direction, on each transformer is chosen to produce each elementary wave. On this figure, the secondary coils of the transformers 14', 15', 16', 17', are one more, designated by the same reference numbers (19, 19', 19", 20', 20", 21, 21', 21", 22', 22").

The couplings of the lines of polyphased distribution at each frequency are represented symbolically by an arrow. As can be seen, these coils are connected in series and feed respectively the terminals 23, 23', 23". The heterodyne 11A is resonated at the frequency $K_1F$ and the heterodyne 12A is resonated at the frequency $K_2F$.

Beginning with these heterodynes, diphased or two-phased distributions are produced in an output. The diphased distribution with the frequency $K_1F$ is designated by 14" and 15" and the diphased distribution at the frequency $K_2F$ is designated by 17" and 18". Each one of the complex distributions 23, 23', 23" results from the addition of two waves, one at the frequency $K_1F$, the other at the frequency $K_2F$. The neutral common terminal of the generator is designated by N and the conductors between the two portions of the generator respectively operating at the frequencies $K_1F$ and $K_2F$ are designated by 23M, 23'M, 23"M. The coupling means of each independent distribution, at each of the frequencies, comprised by the secondary coils of a transformer, are represented on the drawing by a dashline rectangle. Within each rectangle, the phase of the waveform which is furnished is represented figuratively by a vector. Let us suppose that the number of output lines to be fed is N. It being given that the different signals destined for the different tracks 2, 2', 2", etc. are equidistant in time, one is required to create N impulses or "peaks" shifted one in relationship to the other at an angle $$=\frac{2\pi}{N}$$

at the frequency F of the complex output wave (this frequency being the same as that of the recurrence rate of the signals) destined for each line and arriving by the common input track.

At the frequency $K_1F$, we must first consider a phase angle $$\alpha = K_1 \times \frac{2\pi}{N}$$

which defines, at the first frequency $K_1F$, the variation between the waves furnished on the different successive conductors feeding the successive terminals 23, 23', 23" of the generator. If therefore for the first terminal, the first vector $K_1F$ is in phase with the distribution 14", for distribution of the second pulse the potential vector must make an angle $\alpha$ with the first, and for the third distribution, it must make an angle $2\alpha$ and so on.

At the frequency $K_2F$ it is easily understandable that the variation of phase between each distribution will no longer be $\alpha$, but $$\alpha \times \frac{K_2}{K_1}$$

between the first and second distribution $$2\frac{K_2}{K_1}\alpha$$

between the second and the third, and so on.

To effect the required two-phased waveforms at each frequency $K_1F$, $K_2F$, the invention contemplates the utilization of windings having different numbers of turns, disposed on each transformer at each frequency. The potentials at the transformers 14' and 15', on the one hand, and at 17' and 18' on the other, being in quadrature, one places on each transformer, a number of turns proportional to the cosine and sine of the phase angle considered.

In referring to Figure 2, it can be seen that, for the first conductor (23), the vector which represents the waveform at the frequency $K_1F$ is vertical. Since cosine $0° = 1$ and sine $0° = 0$, there is, therefore, placed on the core of the transformer in phase with the frequency $K_1F$, a coil 19 whose number of turns is equal to $R \times 1$. (R being any whole number which will depend upon the amplitude of the tension desired.)

On the core of the transformer in quadrature, we must also place at least one coil 20 whose number of turns is equal to $R \times 0$. As this number is zero, we have a special case where there is no coil.

At the frequency $K_2F$, the vector which represents this wave is also vertical, there is still cosine $0° = 1$, sine $0° = 0$, and a coil 21, having a number of turns equal to $R' \times 1$, (R' being any whole number, dependent upon the amplitude of the desired waveform), is also disposed therefor on the core of the transformer 17' in phase with the frequency $K_2F$. On the core of the transformer in quadrature, a coil 22, whose number of turns is equal to $R' \times 0$, must be placed. Again we have an instance of the special case where there is no coil.

For the second conductor feeding the terminal 23' at the frequency $K_1F$, a number of turns equal to $R \times$ cosine $\alpha$ would be adopted for the coil 19' (in phase). For the coil 20' (in quadrature), the number of spires must be equal to $R \times \text{sine } \alpha$. On the other hand, for the frequency $K_2F$, a number of spires equal to $$R' \cos \cdot \frac{K_2}{K_1} \alpha$$

is utilized in 21'. In coil 22' (in quadrature), the number of turns must be equal to $$R \sin \cdot \frac{K_2}{K_1} \alpha$$

For the third line feeding the terminal 23' at the frequency $K_1F$, a number of turns equal to $R \cos.2\alpha$ is used for coil 19'' (in phase), and for coil 20'' (in quadrature) the number of turns is equal to $R \sin.2\alpha$. On the other hand, for the frequency $K_2F$, a number of turns equal to $$R' \cos \cdot 2\frac{K_2}{K_1} \alpha$$

is used for the coil 21'' (in phase), and for the coil 22' (in quadrature), the number of turns is equal to $$R' \sin \cdot 2\frac{K_2}{K_1} \alpha$$

A similar analysis must be employed in determining the number of turns required in any further coils which are utilized.

The angles of the successive vectors at each frequency have been represented on Figure 2. The orthogonal projections of each of these component vectors which are proportional to a representation of the number of turns on each coil have also been represented, furnishing thereby the elementary waves. Each complex "peak" wave is thus constituted by the addition of several components and each component is obtained by the addition of two elementary waves in quadrature.

Because of the choice of the number of turns of each coil winding discussed above, the maxima succeed one another alternately on each of the terminals 23, 23', 23''. For each of them the maxima at each frequency are produced together at the frequency F. At the moment of the maximum the vectors at the frequencies $K_1F$ and $K_2F$ are in coincidence. This special feature may be verified, by considering that the vectors of the three rectangles situated on the upper part of Figure 2 turn in the direction of the arrow with a speed $K_1F$ and that in the three rectangles situated at the bottom of Figure 2, the vectors turn at the speed $K_2F$.

At the moment shown on the design, the maxima of the waves are produced at the terminal 23. At the end of a time equal to $$\frac{1}{NF}$$

the vectors at the frequency $K_1F$ have rotated (on the upper part of the figure) an angle $\alpha$, while the vectors at the frequency $K_2F$ (on the lower part of the figure), have rotated an angle $$\frac{K_2}{K_1}\alpha$$

The vectors of the wave on the conductor feeding the terminal 23' are both then vertical and the complex wave passes its positive maximum at that instant. At the end of a time $$\frac{2}{NF}$$

the vectors at the frequency $K_1F$ have rotated the angle $2\alpha$, and the vectors at the frequency $K_2F$ have rotated the angle $$2\frac{K_2}{K_1}\alpha$$

The vectors of the wave on the conductor feeding the terminal 23'' are then both vertical, and this wave passes, in turn, its maximum, and so on.

Figure 3:
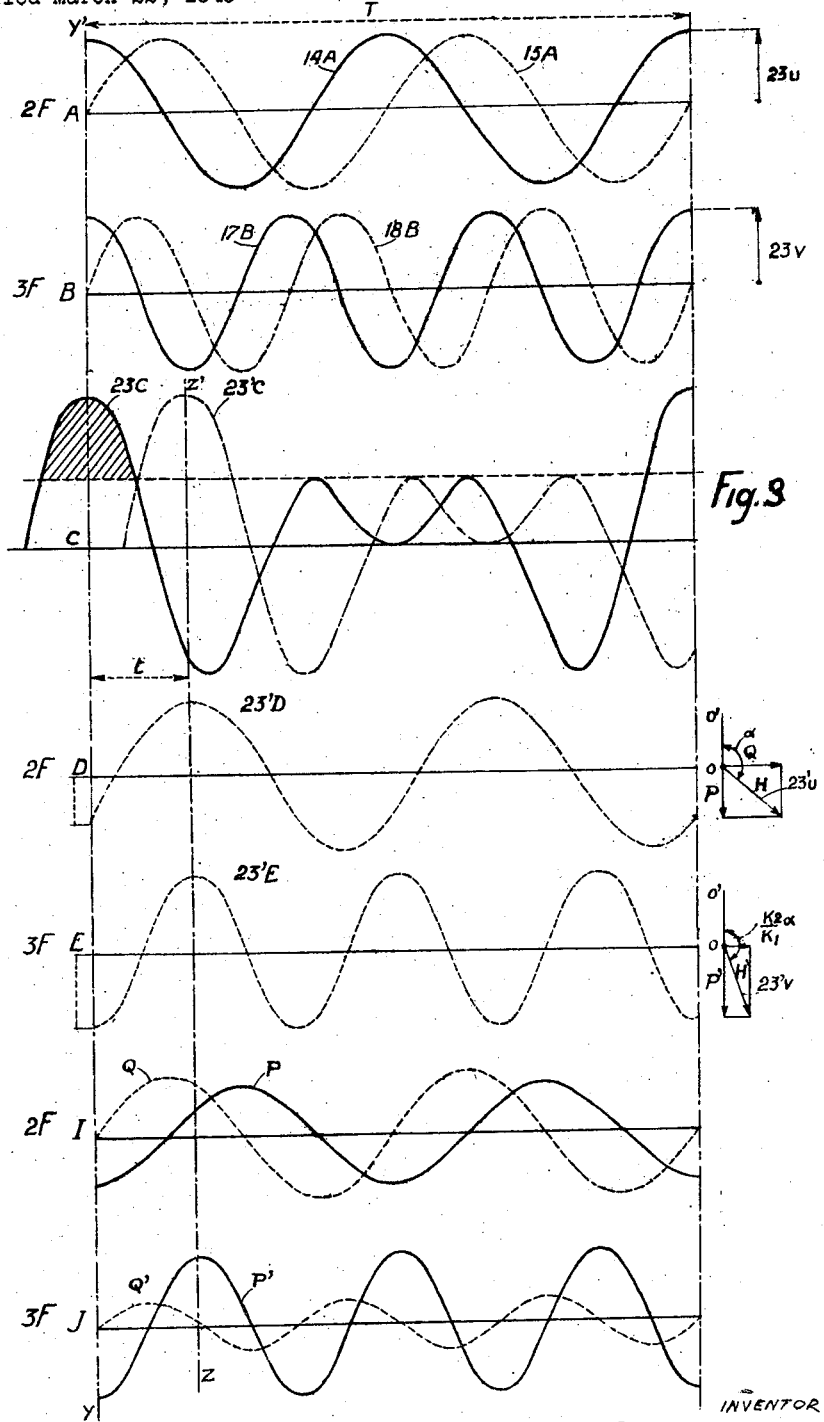
Figure 3 is a diagram illustrating the procedure of additive synthesis of complex waveforms starting with its components at each frequency, the latter being obtained in turn by additive synthesis of elementary tensions.

The manner of constituting the different complex waves by "synthesis" of its elements will be more easily understood in reference to Figure 3, which represents, as a function of time, the waves which appear in the different parts of the system described in the preceding figures.

On this figure, the curve representing the alternating potential corresponding to $K_1F$ of Figure 1, which feeds the primary 14 of the transformer 14' in phase is designated by 14A. In the same way, the curve of the alternating potential at the frequency $K_1F$ which feeds the primary 15 of the second transformer 15' in quadrature is designated by 15A. The figure has been drawn for the special case where $K_1=2$. The two curves have been represented on the first horizontal line A of the drawing. In an analogous fashion, the two corresponding curves of the waves frequency $K_2F$ which feed the primaries 17 and 18 of the third and fourth transformers 17' and 18' are represented by 17B and 18B. The figure has been drawn for the special case where $K_2=3$.

As has already been shown the two waves 14A and 17B each arrive at their maximum at the same moment Y—Y', if this condition is not fulfilled, it will easily be understood by what follows, how the situation can be remedied, or taken into account, by appropriately choosing the number of turns of the different coils. The curve 23c represents, on an arbitrary scale, the complex wave feeding the first terminal 23. It is obtained by adding respectively, point by point, the ordinates of the curves 14A and 17B. It may be remarked that the maxima of the two curves coincide at the origin YY'. This curve of "impacts" feeding the terminal 23 includes a very pronounced "peak" (shaded part). It is this "peak" of potential that is readily used in the switching of impulses.

In order that the pulse distribution may be satisfactorily effected, the conductors to the neighboring terminals 23', 23'', etc. must, by analogy, carry waves having the same form, but shifted in relationship to one another, in such a way that the "peaks" succeed each other at a regular interval.

The wave appearing on the neighboring terminals 23' is represented by 23'c. The problem is to find the means of producing this second complex wave 23'c.

The time of the maximum of this second curve 23'c is represented by the vertical line ZZ'. It is shifted by a quantity T. If the time $$T = \frac{1}{F}$$

which elapses between two maxima of each complex curve is designated by T, then the variation of the signals destined to feed N tracks is the same. The time which elapses between YY' and ZZ' is $$T = \frac{1}{NF}$$

and it corresponds to the variation of phase $$\frac{2\pi}{N}$$

This complex curve 23'c results from the addition of its two components. The components at the frequency 2F is represented in 23'D and 23'E represents the component at the frequency 3F. At the right of the drawing Figures 3D and 3E vectorial diagrams representing the component waves have been indicated. The component of the complex wave 23'c at the frequency 2F is represented by the vector H. The projections of this vector H are represented by P and Q, and the origin by OO'. It can be seen that this vector H is obtained by the addition of two elementary vectors one of which is in opposition to the phase and the other of which is in quadrature, each one of these vectors being of reduced amplitude.

The sinusoidal elementary waves, in phase and in quadrature, at the frequency 2F are represented at Figure 3I. They have respectively the amplitudes P and Q. These waves are provided (see Figures 1 and 2) by the secondary coil windings 19' and 20' of the two transformers 14' and 15'.

In the same way at the right of the drawing Figure 3E the sinusoidal component at the frequency 3F is represented by the vector H', and the projections of this vector are represented by P' and Q'.

The sinusoidal elementary waves at the frequency 3F are also represented at Figure 3J. They have respectively the amplitudes P' and Q' and are furnished (see Figures 1 and 2) by the coil windings 21' and 22' on the transformers 17' and 18'.

The complex curve 23'c results thus from the addition, point by point, of the ordinates corresponding to the 4 curves of elementary waves P, Q and P', Q'. These elementary tensions are produced by the coil windings 19', 20', 21' and 22'. In connecting these coil windings in series, one adds the instantaneous potentials at each winding; this analysis thus justifies the explanation given above concerning the number of windings that must be adopted to produce each elementary wave.

In the example mentioned, it has been supposed that only two component waves are used. In reality a far greater number is used, 3 or 4 for example, and in the same way, the range of harmonics $K_1$ and $K_2$ instead of being two or three will be much higher. For example the harmonics 3, 5, 9, or even 11, 17, 23 will be used.

Instead of placing the generator of the complex wave 23, 23', 23'', etc. directly in series in each line one can also, according to a variation of the invention, pick up this complex wave through inductive coupling. For example, an inductance coil may be installed in series in the circuit of utilization instead of the coil windings themselves, and the alternating complex wave may be made to appear at the terminals of this coil, by means of capacitive coupling.

According to a further variation of the invention, a single group of generators of complex wave-form (23, 23', 23'') permits several independent distributions at the same time; in this case instead of a single common line, several common lines are used and each one serves to feed successively the independent tracks to which it is connected. The generator of the complex waveform is coupled inductively to each one of the static independent distributions thereby constituted, and thus a functioning in "parallel" of these various distributions is realized. Each one of the independent tracks is put into series with an inductance coil and at the same time the complex wave is coupled to the coils of each distribution by means of a capacitive coupling. Instead of using the generators 23, 23', 23'' to create the "peaks" required to distribute impulses to a plurality of independent tracks in the manner described with reference to Figures 2 and 3, one can also utilize the invention for producing other forms of complex waves which may be required in other systems. The technical progress realized by the invention is particularly manifest in distribution systems utilizing simple rectifiers, since in such systems it is particularly important to be able to produce an appreciable current flow in the output thereof. As a matter of fact, when signal distributions utilizing the complex waveforms of this invention are able to produce appreciable currents, one can thus realize signal selection at such a power level that the circuits of utilization can be fed directly, thus eliminating any necessity of installing an amplifier in each independent track (for example, subscribers to a multiplex network, the electrooptic elements, or the parts feeding a multi-elementary television screen, etc.). One can thus realize the amplification of the current in the common track before the distribution, the present system thus constituting both a simplification and a major economy inasmuch as the number of stages used is greatly reduced.

In a still more general manner, the invention may be extended to any procedure of form by synthesizing complex waveforms from elementary waves no matter what end form of wave is required.

It is known that any periodic function can be analyzed, in conformity with the theorem of "Fourier," into a certain number of harmonics having a determined phase and amplitude.

The formation of a complex waveform of period F is therefore realized in accordance with the invention by additive synthesis, the various elementary waves having the phase and the amplitude desired at each frequency.

To obtain this new technical result, the invention utilizes a novel combination of several means already known, individually, as useful in other applications.

The invention may consist therefore of all or part of the following combinations and steps:

1. The interconnection of a plurality of oscillators at various harmonic frequencies of a basic frequency F (example $K_1F$, $K_2F$, etc.).

2. The production, starting with these oscillators, of waves in several independent oscillating circuits, these waves being respectively phase shifted in positive and negative senses by these oscillators (notably through the utilization of two oscillating circuits respectively producing waves in quadrature to one another).

3. Regulating the amplitude of each one of these waves.

4. Adjusting the phases and amplitudes of the waves in relationship to one another, so as to bring the maximum of a wave to be produced in one of the oscillating circuits (at the frequency $K_1F$) into phase coincidence with the maximum in another of the oscillating circuits at the frequency $K_2F$, etc.

5. Amplifying the waves thereby created, notably by means of a "counterreaction" system (or cathodyne system) permitting one to maintain the desired phase relationship in the amplified circuit.

6. Feeding elementary waves, which have been produced, to the primaries of independent transformers (notably, feeding two transformers which are respectively in phase and in quadrature at each frequency).

7. Placing on each of the transformer cores, secondary coils having a predetermined number of turns so that the desired component wave has the required amplitude as determined by a Fourier analysis of the desired end wave and connecting the secondary coil windings in series (notably in phase and in quadrature) at each frequency.

Although only several forms of the invention have been shown and described, the invention is not limited to these particular forms, which are given only as examples and without any restrictive character, and many variations having the same principle and objects as the embodiments disclosed, would come within the scope of the invention.

What I claim and desire to secure by Letters Patent of the United States is:

1. In combination, first oscillator means for generating a signal at frequency $K_1F$, where $K_1$ is a constant integer and $F$ is a value of frequency, second oscillator means for generating a further signal at frequency $K_2F$, when $K_2$ is a further constant integer, different than $K_1$, means for deriving from said signal at frequency $K_1F$ a plurality of further signals at frequency $K_1F$ and of relatively displaced phases, means for deriving from the said signal at frequency $K_2F$ a plurality of further signals at frequency $K_2F$ and of relatively displaced phase, and a plurality of transformers having their primary windings coupled to said first and second oscillator means, said transformers each having secondary windings selectively interconnected for combining selected ones of said further signals, said selectively interconnected secondaries combining different ones of said further signals, to provide a plurality of peaked waves having each a different time of peak occurrence, a single signal input channel, a plurality of signal output channels, a rectifier in each of said plurality of signal output channels, bias voltage means normally blocking each rectifier in its normally conductive direction, and means for applying each separate one of said plurality of peaked waves to unblock a different one of said rectifiers.

2. In combination, first oscillator means including a first plurality of off-resonance oscillator circuits for generating a plurality of waves of a first frequency and of relatively displaced phase, second oscillator means including a second plurality of off-resonance oscillatory circuits for generating a further plurality of waves of a second frequency and of relatively displaced phase, a plurality of transformer means having their primaries coupled to said first and second off-resonance oscillatory circuits, the secondaries of said transformer means being selectively interconnected to one another and to a plurality of output channels for combining, in a plurality of different combinations, waves of said first and second frequencies, to thereby generate resultant gating waves in said output channels, and a plurality of gating circuits each responsive to one of said gating waves in said output channels, each of said gating circuits comprising a rectifier and means normally biasing said rectifier against current conduction in its normally conductive direction, and means applying said gating waves for overcoming the biasing of said rectifiers in succession.

3. In combination, a first oscillator for providing first signals at a first frequency, a second oscillator for providing second signals at a second frequency, said first and second frequencies being harmonically related to a third frequency, first phase shifting means coupled to said first oscillator and responsive to said first signals for providing a pair of fourth signals in phase quadrature at said first frequency, second phase shifting means coupled to said second oscillator and responsive to said second signals for providing a pair of fifth signals in phase quadrature at said second frequency, and transformer means coupled to said first and second phase shifting means for selectively combining selected ones of said fourth and fifth signals, said transformers having their secondaries selectively coupled to a plurality of output channels to provide peaked gating waves having mutually equally time displaced peaks in said output channels, a single signal input channel, a plurality of signal output channels, a rectifier in each of said plurality of signal output channels, bias voltage means normally blocking each rectifier in its normally conductive direction, and means for applying separate ones of said gating waves to different ones of said rectifiers to unbias said rectifiers in sequence.

4. The combination in accordance with claim 3 wherein is further provided means for regulating the amplitudes of said fourth and fifth signals.

5. The combination in accordance with claim 3 wherein is further provided means for selecting said fourth and fifth signals and for controlling the relative amplitudes thereof to establish coincidences of maxima of signal components in each of said gating waves.

6. The combination in accordance with claim 3, wherein said means for providing said fourth and said fifth signals comprises cathode loaded amplifiers.

7. In combination, a first oscillator for providing first signals at a first frequency, a second oscillator for providing second signals at a second frequency, said first and second frequencies being harmonically related, first tuned circuit means for deriving from said first signals a first pair of phase quadrature related signals, second tuned circuit means for deriving from said second signals a second pair of phase quadrature related signals, a plurality of transformers having each a primary winding, means coupling said primaries to said first and second tuned circuit means for energizing each of said primary windings by a different one of said quadrature related signals, each of said plurality of transformers having a plurality of secondary windings, and a plurality of connecting means connecting in series different secondary windings of each of selected ones of said transformers to provide equally time displaced gating waves in a plurality of output channels coupled to said connecting means, a single first signal channel, a plurality of further signal channels connected in parallel to said first signal channel, a biased rectifier in each of said further signal channels for blocking each of said further signal channels, and means for applying said gating waves to unbias said rectifiers in sequence and thereby to unblock said channels in sequence.

8. In combination, four transformers having each a single primary winding and a plurality of secondary windings, means for energizing a first of said primary windings with wave energy at a first frequency and in predetermined phase, means for energizing a second of said primary windings with wave energy at said first frequency and in a phase in quadrature to said predetermined phase, means for energizing a third of said primary windings with wave energy of a second frequency, harmonically related to said first frequency and in locked phase relative to said predetermined phase, means for energizing a fourth of said primary windings with wave energy of said second frequency and of phase in quadrature with said locked phase, each of said transformers comprising secondary windings, and means for connecting selected ones of said secondary windings in series to provide periodic gating waves, a single first signal channel, a plurality of further signal channels connected in parallel to said first signal channel, a biased rectifier in each of said further signal channels for normally blocking each of said further signal channels, and means for applying separate ones of said periodic gating waves to unbias separate ones of said rectifiers, thereby to unblock said further signal channels in succession.

9. The system of claim 8 including means for selectively controlling the amplitude of each of said wave energies.

10. The system of claim 9 in which each of said connecting means forms a portion of a corresponding output channel, each of said output channels including normally inoperative gating means, the said periodic gating waves causing said gating means to be rendered operative in a cyclic sequence.

11. The system of claim 3 including an input receiving a plurality of signals to be coupled selectively to said output channels, and normally inoperative gating means coupling said input to each of said output channels, said gating means including means responsive to said gating waves for rendering said gating means selectively operative.

12. The system of claim 11 in which said input is also coupled to said first and second oscillators for synchronizing the operation of said oscillators.

13. The system of claim 8 in which the number of turns in the secondary windings of said transformers is preselected in accordance with the sine and cosine functions of the desired wave energy vector output from each transformer.

References Cited in the file of this patent

UNITED STATES PATENTS

| Number | Name | Date |
|---|---|---|
| 1,928,093 | Coyle | Sept. 26, 1933 |
| 1,947,484 | Miller | Feb. 20, 1934 |
| 2,048,081 | Riggs | July 21, 1936 |
| 2,277,000 | Bingley | Mar. 17, 1942 |
| 2,352,634 | Hull | July 4, 1944 |
| 2,420,374 | Houghton | May 13, 1947 |
| 2,443,195 | Pensyl | June 15, 1948 |
| 2,471,253 | Toulton | May 24, 1949 |